Patented June 21, 1932

1,864,084

UNITED STATES PATENT OFFICE

HENRY MILLER, OF NEWARK, NEW JERSEY, ASSIGNOR TO NEW PROCESS METALS CORPORATION, OF NEWARK, NEW JERSEY, A CORPORATION OF NEW JERSEY

METHOD OF REMOVING GASES FROM INCLOSED SPACES

No Drawing. Application filed April 15, 1926. Serial No. 102,307.

My invention relates to improvements in methods of removing gases from inclosed spaces and while the invention in its broader aspects may be applied to the removal or fixation of gases in various arts, it is particularly useful in connection with the removal or fixation of gases in radio tubes or vacuum bulbs in order to "clean up" or "get" the most of the remaining gases therein after the same have been evacuated or most of the air etc. withdrawn therefrom by pumping. Certain metallic compounds or bodies have heretofore been used in such devices for the purpose of "getting" or combining with or absorbing such residual obnoxious gases and for such purpose it has been common to place a small quantity of the metallic body or compound in the vacuum tube or inclosed space and after the tube has been evacuated, then heat the body or compound in the tube to such an extent that it reacts with the residual gases and combines or absorbs the same to a more or less extent.

I have discovered, however, that if cerium or certain cerium compounds or bodies containing one or more of the cerium group of rare earth metals are used as "getters" for this purpose, the residual gases may be more efficiently removed and also in many cases the resultant vacuum bulb or tube is rendered more effective thereby.

While cerium and many of its alloys with other metals and compounds of the metals may be used, I prefer to use an alloy of cerium and certain other metals and preferably one which contains certain nitrides and suboxides of some of these metals and I find that when such metallic bodies or compounds are used as "getters" and placed in vacuum tubes or bulbs in the usual way and then heated until they become active in combining with the gases in the space in the tube or bulb the residual obnoxious gases therein are more efficiently absorbed and combined with the "getter" material.

While various methods may be used for producing such improved "getter" material, I prefer to obtain the same in the following manner. First an electrolyte is made containing cerium and other minerals of the rare earth group. Instead of starting with natural cerium minerals, I prefer to use the waste obtained in the manufacture of lanthanum or thorium. This waste occurs as a yellowish mud and contains a relatively large quantity of cerium and small quantities of certain other metals of the rare earth group such as lanthanum etc. This mud may be obtained as a by-product in the process of making thorium or lanthanum for the gas mantle industry. In any event, I prefer to take the cerium containing material and dissolve it in hydrochloric acid and then clarify and filter the solution and evaporate the same to dryness, the resultant chlorides of cerium etc. are thus produced in solid form and the same is then broken up and gradually added to an electric furnace wherein the metals are separated from the chlorine in the manner described in Hirsch U. S. Patent 1,273,223. At the end of the run as described in said patent, the heat and current are shut off and the material cooled therein and after it is cooled, the agglomerated metal alloy called "misch-metal" is removed. Some of the iron from the furnace will usually have become alloyed with the metal, usually from 2% to 30%, so that the resulting alloy will not only contain a substantial amount of cerium but also from 2% to 30% of iron and certain quantities of other rare earth metals and also some carbon from the carbon electrode of the furnace.

While metallic cerium may be used as "getter", I find that such an alloy, obtained as above, is more advantageous in that the iron which seems to render the alloy more pyrophoric also seems to make it serve better as a "getter" for gases in vacuum tubes as above described. I find, however, that even this alloy may be greatly improved as a "getter" for such gases by further refining it or treating it and for this purpose I preferably place the alloy in a crucible and melt under a layer of barium chloride as described in Hirsch Patent 1,290,010. I believe that by thus melting the misch-metal alloy under a layer of barium chloride which keeps it out of contact with the atmosphere, the alloy is purified in such a way as to remove certain gases and impurities, whereby it is rendered more active for "getter" purposes. I believe this is brought about by reason of gases being driven off by the alloy into the barium chloride. If the melt be now allowed to cool and the batch of metal alloy separated from the crucible and layer of barium chloride, it will be found to have much better properties as a "getter" for gases.

However, I find that it is still possible to increase its activity as a getter if instead of allowing the melt to cool in the crucible the molten metal is poured through a small hole in the barium chloride layer into suitable molds whereby it is cast in small pieces as described in said Hirsch Patent 1,290,010. I believe that the increased activity of the material for getter purposes thus produced is due to the fact that when the alloy is poured into the molds it comes more or less in contact with the air whereby nitrogen and oxygen of the air unite with some of the rare earth metals forming nitrides thereof and unsaturated oxides or suboxides of the rare earth metals and particularly of the cerium group of the rare earth metals. These nitrides and unsaturated oxides or suboxides, I believe, readily defuse through the batch of molten metal as it is being poured and cast. However, since the time that the molten metal remains in contact with the air is very short, there is not sufficient time for the batch of metal as a whole to become thoroughly oxidized but the body of cast alloy so made does contain I believe substantial quantities of nitrides and suboxides which I believe greatly "activate" the material for "getter" purposes. In any event I find that when the material has been so treated and activated it shows a strong affinity for many gases such as oxygen or nitrogen and serves especially well for the removal of gases from vacuum tubes and the like as above described.

As above pointed out a small quantity of carbon will be found in the alloy and this I believe more or less combines with various of the rare earth metals to form carbides and such carbides of the rare earth metals and particularly of those of the cerium group of rare earth metals, also seem to improve the alloy material for getter purposes.

I also find that the getter properties of the material may be further improved by including in the misch metal alloy small quantities of one or more metals of the alkali and alkaline earth groups such as potassium, sodium, magnesium, calcium etc. These metals are preferably added in metallic form to the casting melt; that is, the melt which is made under the layer of barium chloride. These metals probably remain in the material largely in the metallic form, although it is probable that to some extent they are converted into the form of carbides, nitrides and/or suboxides ($Ce_2O_3$). It may also be that some of the metals in the material may be in the form of hydrides since in the electrolytic process in the electric furnace, I believe some hydrogen is set free which would likely bring about such combinations. I prefer to use a material in which the alkali and alkaline earth metals taken as a whole do not constitute more than about 10% by weight of the material. Other metals may be added to the resulting alloy with more or less advantage as a substitute for or in addition to the iron, including other metals of the iron group such as nickel, cobalt, etc. Also the addition of, certain amounts of aluminum and magnesium seems to make the resulting material particularly effective.

I believe that the treatment whereby small quantities of the metal or metals are converted to nitrides or suboxides is of particular importance for "activating" the material in order that it may be most efficient for removing gases from vacuum tubes and the like. In any event the treatment above described does produce a material which is far more active for removing gases than the pure cerium metal or the simple pure alloy of cerium and other rare earth metals. The addition of iron, nickel, cobalt and other metals of the iron group, I believe, make the alloy more easily workable and more stable in the air at ordinary temperatures. Such addition also seems to prevent the alloy in operation from becoming entirely coated with saturated oxide or to such an extent that the interior of the body of the material is prevented from acting effectively as desired.

When a piece of such misch-metal material is secured to the so-called plate in a radio vacuum bulb and heated for example as by means of a surrounding high frequency coil, the gases in the tube are given off therein from the metal parts in the tube as the same are heated and appear to react with the material. If no such iron or equivalent metal is present in the material, the getter material seems to be more quickly covered with a layer of oxide or other material which substantially entirely incloses the active material and thus seems to prevent proper operation of the material as a getter. But with the iron and/or other equivalent metals present, such an inclosing layer seems to be prevented and the material acts more efficiently for the purposes in question. Furthermore I believe that by varying the proportion of iron or other metals or compounds in the material, the melting point and the point of activation of the getter material may be advantageously adjusted, That is, with the iron or other equivalent metals or materials included in the getter material, the getter material seems to act to absorb or combine with the gases as described, but still remain as a body of material in its original position.

Thus I believe that by including such compounds as nitrides, carbides and/or suboxides, the getter material is made to contain certain relatively unstable compounds which become active or kindle at a temperature below the melting point of the metal of the material.

The addition of the alkali and alkaline earth metals I believe improve the material by lowering the melting point of the resulting alloy and so lowering the temperature to which the material must be heated before it is sufficiently active to readily combine with or absorb the residual gases in the tube. The presence of these alkali and alkaline earth metals also seem to regulate the action to some extent which I believe enables the material to more thoroughly combine with the residual gases from all portions of the bulb or space from which the gases are to be removed. If desired, a small amount of carbon may be added to the melt under the layer of barium chloride in order that more of the carbides may be produced in the resulting alloy material. I have found that an alloy of cerium misch-metal and containing also iron, aluminum, magnesium, calcium, potassium and carbon and containing some nitrides and suboxides of various of these metals is particularly efficient for the purposes in question and may be readily prepared in the manner above described. Such an alloy material is highly pyrophoric; that is, when scratched or abraded it will evolve showers of sparks, and my investigations indicate that such pyrophoric materials serve particularly well for the removal of gases as described. However, many of these metals and compounds may be omitted and still a good getter material may be obtained.

While I have described my improvements in great detail and with respect to certain preferred embodiments thereof, I do not desire to be limited to such details or embodiments since many changes and modifications may be made and the invention embodied in widely different forms without departing from the spirit and scope thereof in its broader aspects. Hence I desire to cover all equivalents and all modifications and forms coming within the language or scope of any one or more of the appended claims.

What I claim as new and desire to secure by Letters Patent is:

1. As an article of manufacture a thermionic tube having a getter material containing an alloy of cerium and other metals having a nitride and suboxide of certain rare earth metals therein.

2. As an article of manufacture a thermionic tube having a getter material containing an alloy of cerium and other metals including a metal of the iron group and having a nitride and suboxide of certain rare earth metals therein.

3. As an article of manufacture a thermionic tube having a getter material containing an alloy of cerium, misch-metal and iron, magnesium and aluminum, and having a nitride and suboxide of certain of the rare earth metals therein.

4. As an article of manufacture a thermionic tube having a getter material containing a pyrophoric metal material containing a nitride of a rare earth metal.

In testimony whereof I have signed my name to this specification.

HENRY MILLER.